US007689737B2

(12) United States Patent
Yoshimoto

(10) Patent No.: US 7,689,737 B2
(45) Date of Patent: Mar. 30, 2010

(54) DATA I/O APPARATUS FOR OUTPUTTING IMAGE DATA VIA A NETWORK

(75) Inventor: Mamoru Yoshimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 11/274,145

(22) Filed: Nov. 16, 2005

(65) Prior Publication Data

US 2006/0123155 A1    Jun. 8, 2006

(30) Foreign Application Priority Data

Nov. 16, 2004    (JP)    ............... 2004-332107

(51) Int. Cl.
*G06F 13/00* (2006.01)
*H04N 5/45* (2006.01)
*H04N 5/445* (2006.01)

(52) U.S. Cl. ................... 710/31; 348/565; 348/568

(58) Field of Classification Search .................. 710/31
See application file for complete search history.

(56) References Cited

U.S. PATENT DOCUMENTS

| 5,699,345 | A  | * | 12/1997 | Watanuki et al. | ............ 370/232 |
| 6,636,483 | B1 | * | 10/2003 | Pannell | ....................... 370/236 |
| 6,779,078 | B2 |   | 8/2004  | Murotani et al. | ............ 711/112 |
| 7,039,934 | B2 | * | 5/2006  | Terakado et al. | .............. 725/37 |
| 7,359,955 | B2 | * | 4/2008  | Menon et al. | ................ 709/219 |
| 2002/0114286 | A1 | * | 8/2002 | Iwamura et al. | ............. 370/252 |
| 2004/0123032 | A1 | * | 6/2004 | Talagala et al. | ............. 711/114 |

FOREIGN PATENT DOCUMENTS

JP    2001-337790    12/2001

* cited by examiner

*Primary Examiner*—Niketa I Patel
*Assistant Examiner*—Zachary K Huson
(74) *Attorney, Agent, or Firm*—Fitzpatrick, Cella, Harper & Scinto

(57) ABSTRACT

There is provided the first storage unit for storing original data, and the second storage unit for storing meta-data. Under the control of a path control unit, an optimal connection process can be performed. As a result, a stream from the first storage unit for storing the original data can always be transmitted at maximum.

10 Claims, 7 Drawing Sheets

DATA I/O APPARATUS FOR OUTPUTTING IMAGE DATA VIA A NETWORK

FIELD OF THE INVENTION

The present invention relates to a data I/O apparatus for efficiently implementing a storage or broadcast system, which stores/broadcasts information that requires a broad bandwidth such as a High-Definition Television (HDTV) image.

BACKGROUND OF THE INVENTION

Generally, a conventional data I/O apparatus is implemented by the same structure as the internal structure of a so-called PC (personal computer) using a microprocessor, in which a hard disk is connected to a processor bus. In order to efficiently read and write data by using a plurality of storage apparatuses, the data is migrated to a proper storage apparatus by perfectly copying the data. As one example of this technique, see Japanese Patent Laid-Open No. 2001-337790.

As described above, recently, a high-resolution moving image such as an HDTV image has become widely used. Accordingly, the need for efficiently implementing a storage or broadcast system, which stores/broadcasts information that requires a broad bandwidth has received a great deal of attention.

However, as the high-resolution moving image such as an HDTV image is used more widely, a broader bandwidth is required to transmit the data from a storage unit. As a result, when a plurality of contents are to be simultaneously read out, the bandwidth sometimes becomes insufficient. Accordingly, all the required contents cannot be enjoyed, thus posing a problem. In order to solve this problem, an expensive storage unit having a broad bandwidth must be used, thus increasing the cost.

SUMMARY OF THE INVENTION

It is a feature of the present invention to solve the above-described conventional problems.

According to the characteristic feature of the present invention, there is provided a data I/O apparatus which improves user's operability at a low cost.

According to an aspect of the present invention, there is provided with A data I/O apparatus comprising:
an input control unit configured to input data via a network;
an output control unit configured to output data via the network;
a data conversion unit connected to the network, configured to convert data;
a first storage unit configured to store data:
a second storage unit configured to store meta-data of the data stored in the first storage unit;
a first storage control unit connected to the network, configured to control storing data into the first storage unit;
a second storage control unit connected to the network, configured to control storing the meta-data into the second storage unit;
a switching unit configured to change a connection, based on a destination address, between the input control unit, the output control unit, the data conversion unit, and the first and second storage control units; and
a path control unit configured to control the switching unit to change the connection between any of the input control unit, the output control unit, the data conversion unit, and the first and second storage units.

According to another aspect of the present invention, there is provided with A data I/O apparatus comprising:
a storage unit configured to store data;
a plurality of control units connected to the storage unit via a network, configured to transmit and receive the data;
a switching unit configured to change a connection between the plurality of control units in the network; and
a path control unit configured to cause the switching unit to change the connection on the basis of a destination address of the data.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

An embodiment that helps understand the generic concept, concept between generic and subordinate concepts, and subordinate concept of the present invention will be described hereinafter. The appended claims do not always describe all concepts included in the following embodiment. However, such concepts are not excluded on purpose from the technical scope of the patent invention.

Figure 1:
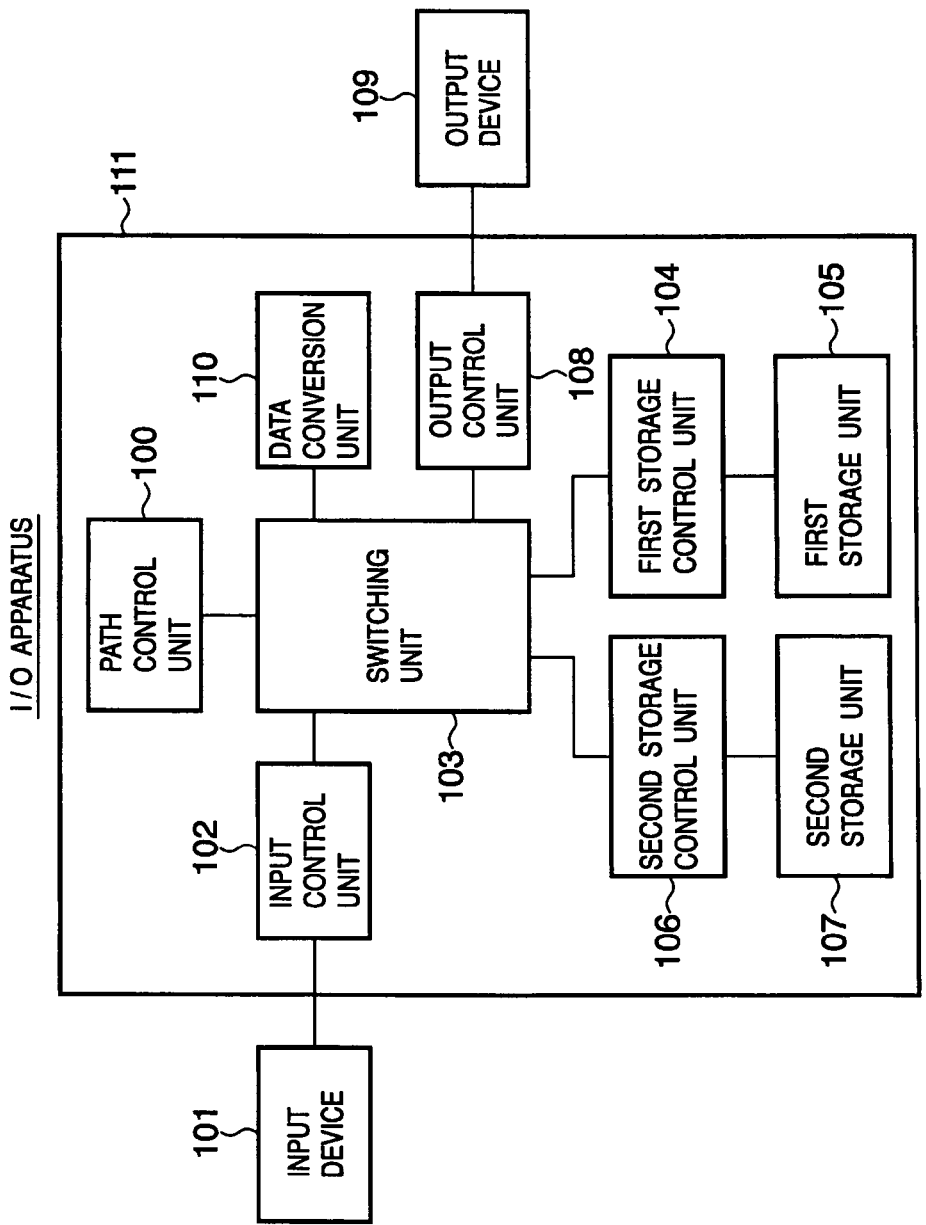
FIG. 1 is a block diagram showing the functional arrangement of a data I/O apparatus according to an embodiment of the present invention.

FIG. 1 is a block diagram showing the functional arrangement of a data I/O apparatus according to an embodiment of the present invention.

A data I/O apparatus 111 processes data from an input device 101, and outputs the processed data to an output device 109.

The data I/O apparatus 111 includes an input control unit 102 which has a data input means and can be connected to a network, a switching unit 103 which has a connection means operated in accordance with a destination address, and a first storage unit 105 which stores the data. The data I/O apparatus 111 also includes a first storage control unit 104 which controls to store the data in the first storage unit 105 and can be connected to the network. The data I/O apparatus 111 includes a second storage unit 107 which stores meta-data of the data stored in the first storage unit 105, and a second storage control unit 106 which controls to store the meta-data in the second storage unit 107 and can be connected to the network. The data I/O apparatus 111 includes an output control unit 108 which has a data output means and can be connected to the network, and a data conversion unit 110 which has a data conversion means and can be connected to the network. The data I/O apparatus 111 also includes a path control unit 100 which controls to connect the input control unit 102, output control unit 108, data conversion unit 110, first storage control unit 104, and second storage control unit 106 via the switching unit 103.

Note that the output control unit 108 can convert the data into a format which can be processed by the output device 109, and then transmit the converted data to the output device 109. For example, when the data transmitted to the output control unit 108 via the switching unit 103 is digital data, and the output device 109 is an analog TV, the output control unit 108 performs D/A conversion.

The input control unit 102 can convert the data from the input device 101 into a format mainly used in the I/O apparatus. For example, when the input device 101 is an analog video camera, and the I/O apparatus processes the moving image mainly as digital data, the input control unit 102 performs A/D conversion.

Figure 2:
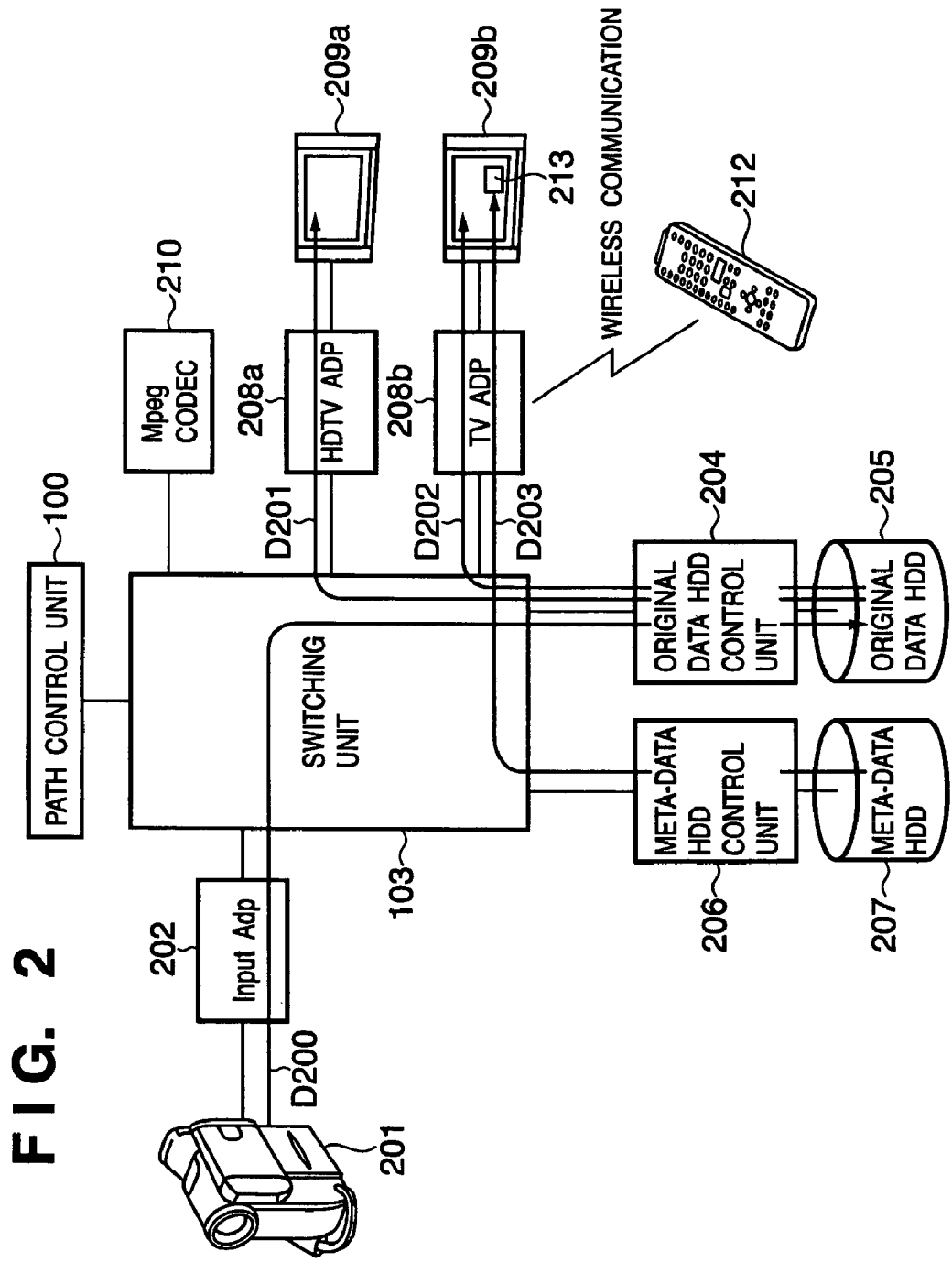
FIG. 2 depicts a schematic view showing a data flow in the data I/O apparatus according to the embodiment of the present invention.

FIG. 2 depicts a schematic view showing a data flow in the data I/O apparatus according to the embodiment of the present invention.

In the embodiment of the present invention, schematic operation will be described below. First, a user searches on a sub-window 213 for a content that the user wants to view next, while viewing original image data saved in an original data HDD 205 corresponding to the first storage unit 105 on an analog TV 209b corresponding to the output device 109. When the target content is found on the sub-window 213, the display on the main display of the analog TV 209b is changed to the target content.

The path control unit 100 controls to connect these control units, and serves as the main unit in this system. A DVC (Digital Video Camcoder) 201 corresponds to the input device 101 connected to the system, and may be commercially available. An INPUT_ADP 202 corresponds to the input control unit 102 which is used to transmit the input data from the DVC 201 to the switching unit 103. In the embodiment, the INPUT_ADP 202 is connected to the DVC 201 via an IEEE1394 interface, and connected to the switching unit 103 via 1 Gbit Ethernet. In this embodiment, it is possible to connect plural input devices to the switching unit 103 via the INPUT_ADP 202.

The switching unit 103 is a switch for connecting the control units, and can employ any scheme as far as the connection can be changed in accordance with the destination address. In this embodiment, the switching unit 103 is connected via 1 Gbit Ethernet. The original data HDD 205 corresponds to the first storage unit 105 which stores the original data. The original data HDD 205 is connected to an original data HDD control unit 204 corresponding to the first storage control unit 104 in various methods, e.g., IDE (Integrated Drive Electronics), serial ATA, and SCSI (Small Computer System Interface). In this embodiment, any connection scheme can be employed as far as a general interface can be accessed. All the data stored in this apparatus by the user is saved in the original data HDD 205. The original data HDD control unit 204 has a disk management function of the original data HDD 205, and a network interface, which connects to the switching unit 103. The original data HDD control unit 204 serves as a storage control unit for sharing files in the system.

A meta data HDD 207 corresponds to the second storage unit 107 which stores the meta data of the file data saved in the original data HDD 205. Similar to the original data HDD 205, the meta data HDD 207 can be connected to a meta data HDD control unit 206 corresponding to the second storage control unit 106 by any connection schema as far as a general interface can be accessed. The meta data HDD control unit 206 has a 1 Gbit Ethernet interface which connects to the switching unit 103, and an interface which connects to the meta data HDD 207. In response to a file search request from each control unit, a search process is performed using the meta data stored in the meta data HDD 207.

Preferably, the meta-data contains compressed moving image data stored in the original data HDD 205. This moving image data is preferably compressed by decreasing the moving image size (vertical and horizontal pixel counts).

A TV_ADP 208b has a function of displaying an image on the analog TV 209b, and processes control information and the image data in the system. The TV_ADP 208b corresponds to the output control unit 108. An HDTV 209a and the analog TV 209b correspond to the output device 109. A remote controller 212 is used when the user operates the system. For example, the remote controller 212 is used to search for the content saved in the system, or display a thumbnail moving image on the sub-window 213. The sub-window 213 is used in the system to search for the content data saved in the system, and display the thumbnail moving image.

An Mpeg_CODEC 210 corresponds to the data conversion unit 110. In this embodiment, for example, the Mpeg_CODEC 210 is used to convert an image compression scheme from MPEG4 to MPEG2, but Mpeg_CODEC 210 may also be a module having various image compression functions. The Mpeg_CODEC 210 may also be an image conversion unit having a function of converting the image compression scheme into, e.g., H.264.

FIG. 2 shows the states of data streams D200 to D203 for simultaneously performing the following processes, and displaying the sub-window 213 used for searching for the content on the analog TV 209b. The processes are: (1) a process of storing the image data from the DVC 201 into the original data HDD 205; (2) a process of playing back on the HDTV 209a the content of the HDTV 209a stored in the original data HDD 205; and (3) a process of playing back on the analog TV the content of the analog TV 209b stored in the original data HDD 205.

Note that reference symbol D200 denotes the data stream for saving the data of the DVC 201 in the original data HDD 205, and its data transmission rate is 32 Mbps. Reference symbol D201 denotes the stream for displaying on the HDTV 209a the high-resolution moving image data saved in the storage unit, and its transmission rate is 25 Mbps. Reference symbol D202 denotes the stream for displaying the moving image data saved in the storage unit on the analogue TV 209b. Reference symbol D203 denotes the stream for displaying on the analogue TV 209b a menu for the user in order to search for the meta-data using the meta-data HDD control unit 206. When the compressed moving image is held as the meta-data, the stream of the compressed moving image may be sent from the meta-data HDD 207, and the moving image (meta-data) may be displayed on the sub-window 213 of the analog TV 209b.

Figure 3:
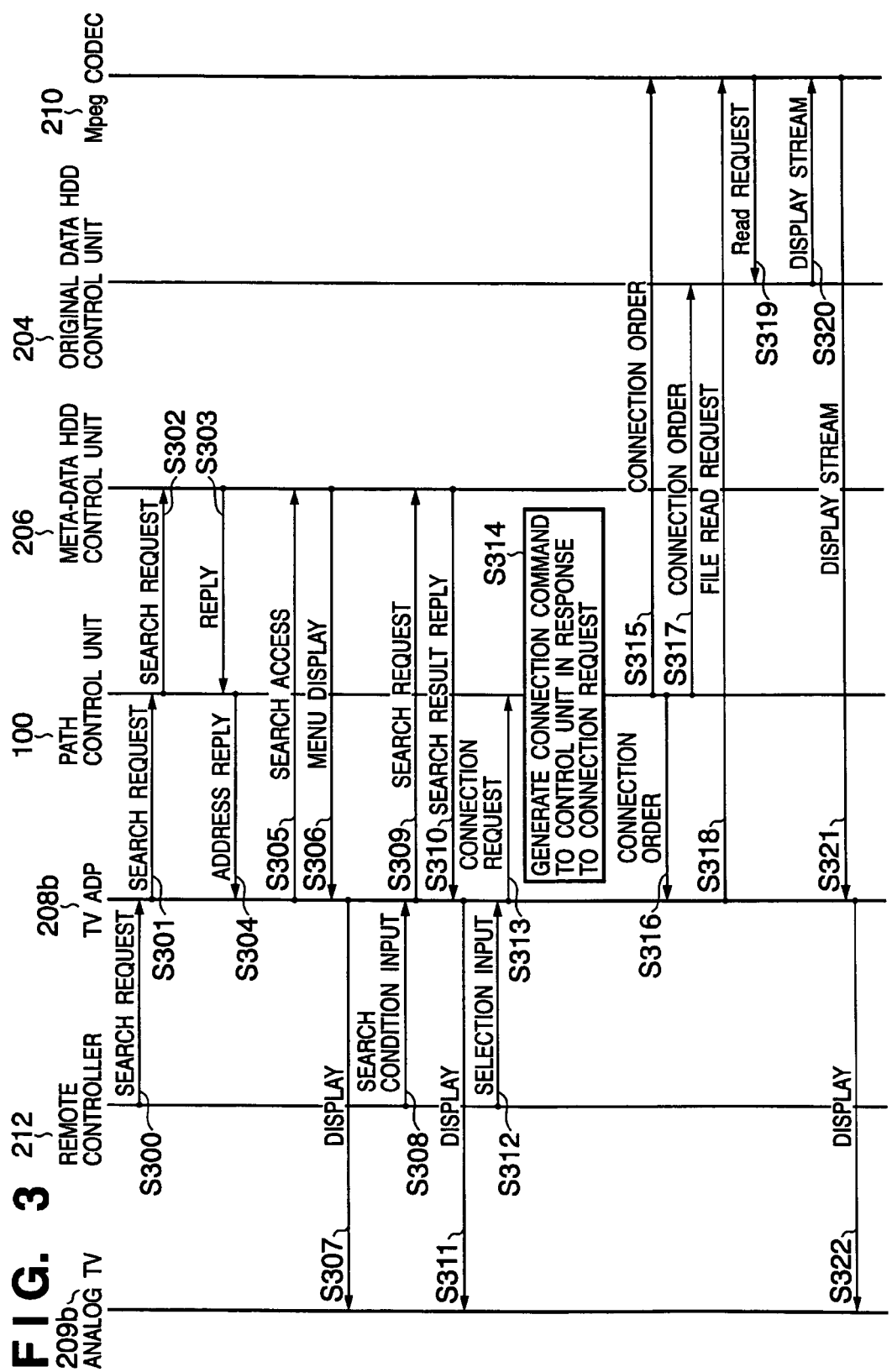
FIG. 3 depicts a schematic view showing sequence in display operation in the data I/O apparatus according to the embodiment of the present invention.

FIG. 3 depicts a schematic view showing sequence of display operation in the data I/O apparatus according to the embodiment of the present invention. The operation sequence for changing the display state in FIG. 2 in accordance with user's search request and selection will be described below.

A search request signal S300 is a search request command transmitted from the remote controller 212 to the TV_ADP 208b. A search request signal S301 is a search request command transmitted from the TV_ADP 208b to the path control unit 100. A search request signal S302 is a search request command transmitted from the path control unit 100 to the meta-data HDD control unit 206 to inquire whether the search process can be accepted.

A reply signal S303 is a reply signal transmitted from the meta-data HDD control unit 206 to the path control unit 100 in response to the search request signal S302. When the search process is acceptable, the meta-data HDD control unit 206 sends back the address for accepting the search process. When the process is congested, the meta-data HDD control unit 206 sends back a message representing that the search process is unacceptable. An address reply signal S304 is a signal which is transmitted from the path control unit 100 to the TV_ADP 208b, and contains a search acceptable address. A search access signal S305 is a search start signal transmitted from the TV_ADP 208b to the meta-data HDD control unit 206. At this time, the destination address is determined on the basis of the address information obtained by the address reply signal S304. A menu display signal S306 is data transmitted from the meta-data HDD control unit 206 to the TV_ADP 208b to display a search menu.

A display signal S307 is menu display information which is transmitted from the TV_ADP 208b to the analog TV 209b, undergoes a PinP (Picture in Picture) process in the TV_ADP 208b, and is sent via an S interface.

A search condition input signal S308 indicating a search condition is transmitted from the remote controller 212 to the TV_ADP 208b wirelessly. A search request signal S309 is a search process request transmitted from the TV_ADP 208b to the meta-data HDD control unit 206, and contains a search condition. Upon reception of the search request signal S309, the meta-data HDD control unit 206 performs the search process.

A search result reply signal S310 is search result data transmitted from the meta-data HDD control unit 206 to the TV_ADP 208b. A display signal S311 is search result display information transmitted from the TV_ADP 208b to the analog TV 209b, undergoes the PinP process in the TV_ADP 208b, and is sent via the S interface. A selection input signal S312 is information transmitted from the remote controller 212 to the TV_ADP 208b, and indicates the selected search result. A connection request signal S313 is a connection request command transmitted from the TV_ADP 208b to the path control unit 100, and contains a content ID, display device ID, and the like.

In accordance with a signal S314, the path control unit 100 performs a connection configuration process for connection to the control units. The connection configuration process in the path control unit 100 is further explained referring to FIG. 6. A signal S315 is a connection command transmitted from the path control unit 100 to the Mpeg_CODEC 210, and contains connection address information. A signal S316 is a connection command transmitted from the path control unit 100 to the TV_ADP 208b, and contains the connection address information. A signal S317 is a connection command transmitted from the path control unit 100 to the original data HDD control unit 204, and contains the connection address information.

A signal S318 is a file read request transmitted from the TV_ADP 208b to the Mpeg_CODEC 210. A signal S319 is a file read request transmitted from the Mpeg_DEC 210 to the original data HDD control unit 204. A display stream signal S320 is a display stream transmitted from the original data HDD control unit 204 to the Mpeg_CODEC 210. A display stream signal S321 is a display stream transmitted from the Mpeg_CODEC 210 to the TV_ADP 208b. A display signal S322 is the stream data of the content selected in accordance with the signal S312. The display signal S322 is transmitted from the TV_ADP 208b to the analog TV 209b via the S interface.

In the above operation, the window can be changed with less stress on the user.

Figure 4:
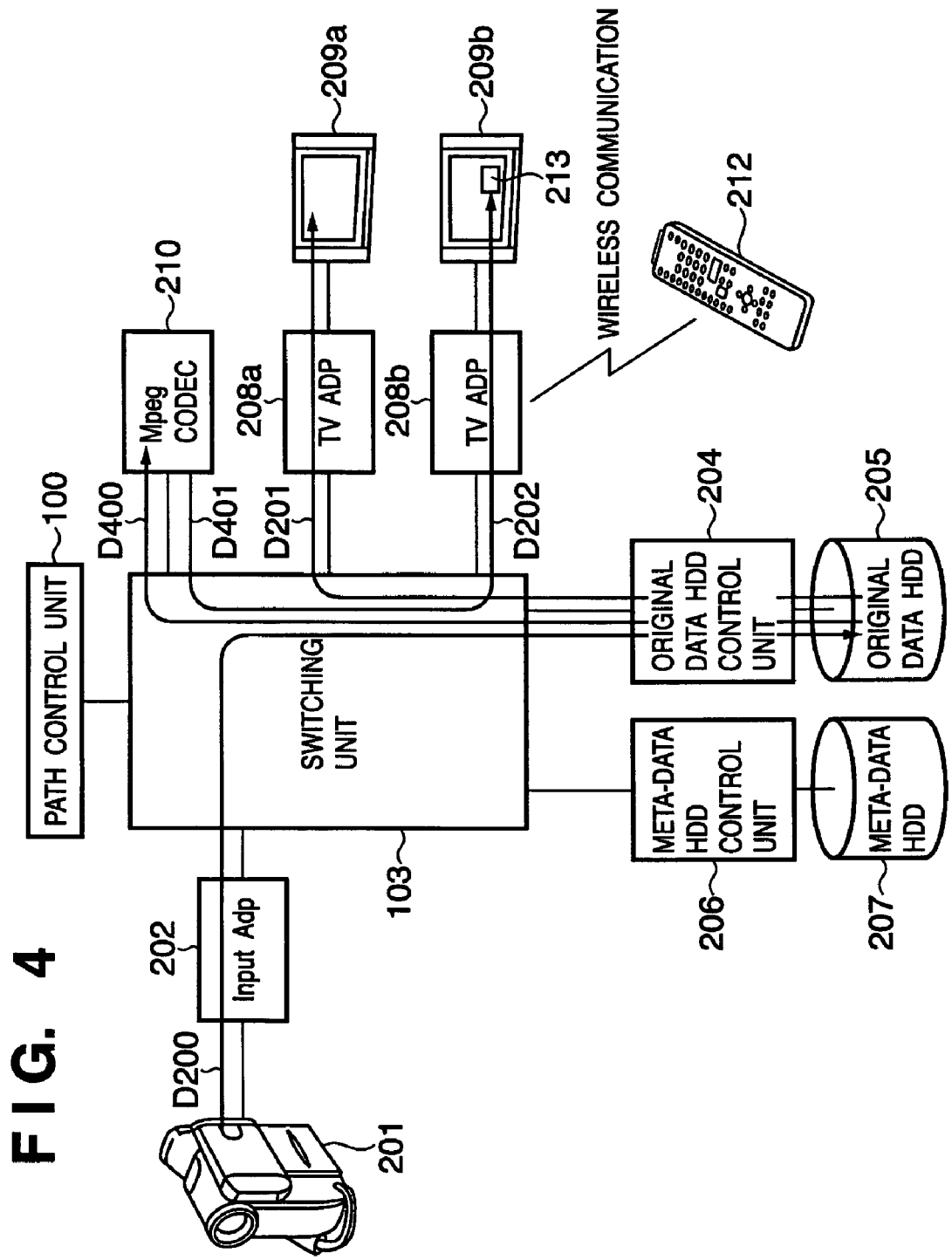
FIG. 4 depicts a schematic view showing a stream data flow in a state wherein the display of an analog TV is changed, in the data I/O apparatus according to the embodiment of the present invention.

FIG. 4 depicts a schematic view showing a stream data flow in a state wherein the display of the analog TV 209b is changed, in the data I/O apparatus according to the embodiment of the present invention. In FIG. 4, the streams D200 and D201 keep the states shown in FIG. 2.

The stream D203 shown in FIG. 2 is disconnected before transmitting a stream D400. The stream D400 is a newly selected display stream signal S320 shown in FIG. 3. Since the stream D400 must be converted, a 2-Mbps transmission bandwidth connected to the Mpeg_CODEC 210 for the conversion process is required. The stream D400 corresponds to the display stream signal S320 shown in FIG. 3. A stream D401 is display stream data which is transmitted from the Mpeg_CODEC 210 to the TV_ADP 208b, and requires a 3-Mbps transmission bandwidth. The stream D401 corresponds to the display stream signal S321 shown in FIG. 3.

Figure 5:
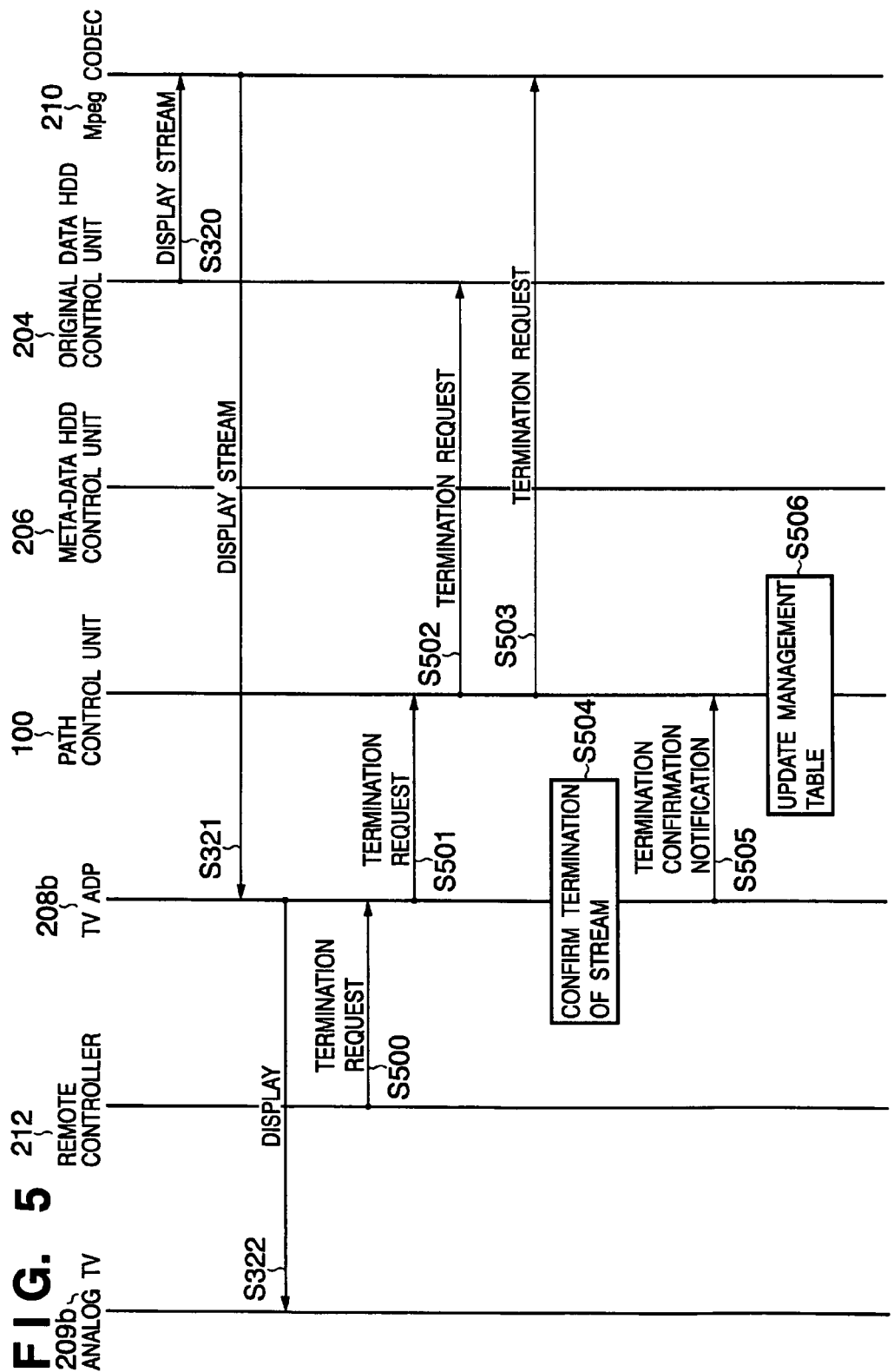
FIG. 5 depicts a schematic view showing sequence in display termination operation in the data I/O apparatus according to the embodiment of the present invention.

FIG. 5 depicts a schematic view showing sequence of display termination operation in the data I/O apparatus according to the embodiment of the present invention. Note that the display termination operation occurs in cases including when content stream terminates and when forced termination operation is performed using the remote controller 212. The content stream termination operation is started when the TV_ADP 208b recognizes that the data is no longer received. FIG. 5 shows the forced termination operation performed using the remote controller 212.

A termination request signal S500 is a termination request command transmitted from the remote controller 212 to the TV_ADP 208b. A termination request signal S501 is a termination request command transmitted from the TV_ADP 208b to the path control unit 100. The termination request signal S501 contains path ID information unique to each connection request in the system. Accordingly, the path control unit 100 can identify the control unit for transmitting the termination request.

A termination request signal S502 is the termination request transmitted from the path control unit 100 to the original data HDD control unit 204. Upon reception of the termination request signal S502, the original data HDD control unit 204 terminates the stream.

A termination request signal S503 is the termination request transmitted from the path control unit 100 to the Mpeg_CODEC 210. Upon reception of this signal, the Mpeg_CODEC 210 terminates the data conversion process and stream. A signal S504 indicates a process of confirming the termination of the display stream in the TV_ADP 208b. In this embodiment, it is confirmed by a timer that the data is not transmitted.

A termination confirmation notification signal S505 is a signal transmitted from the TV_ADP 208b to the path control unit 100 for notifying that the stream has terminated. In accordance with a signal S506, the path control unit 100 deletes a path management table and updates a management table. For example, for updating the management table, the status information of the control unit is made free.

Figure 6:
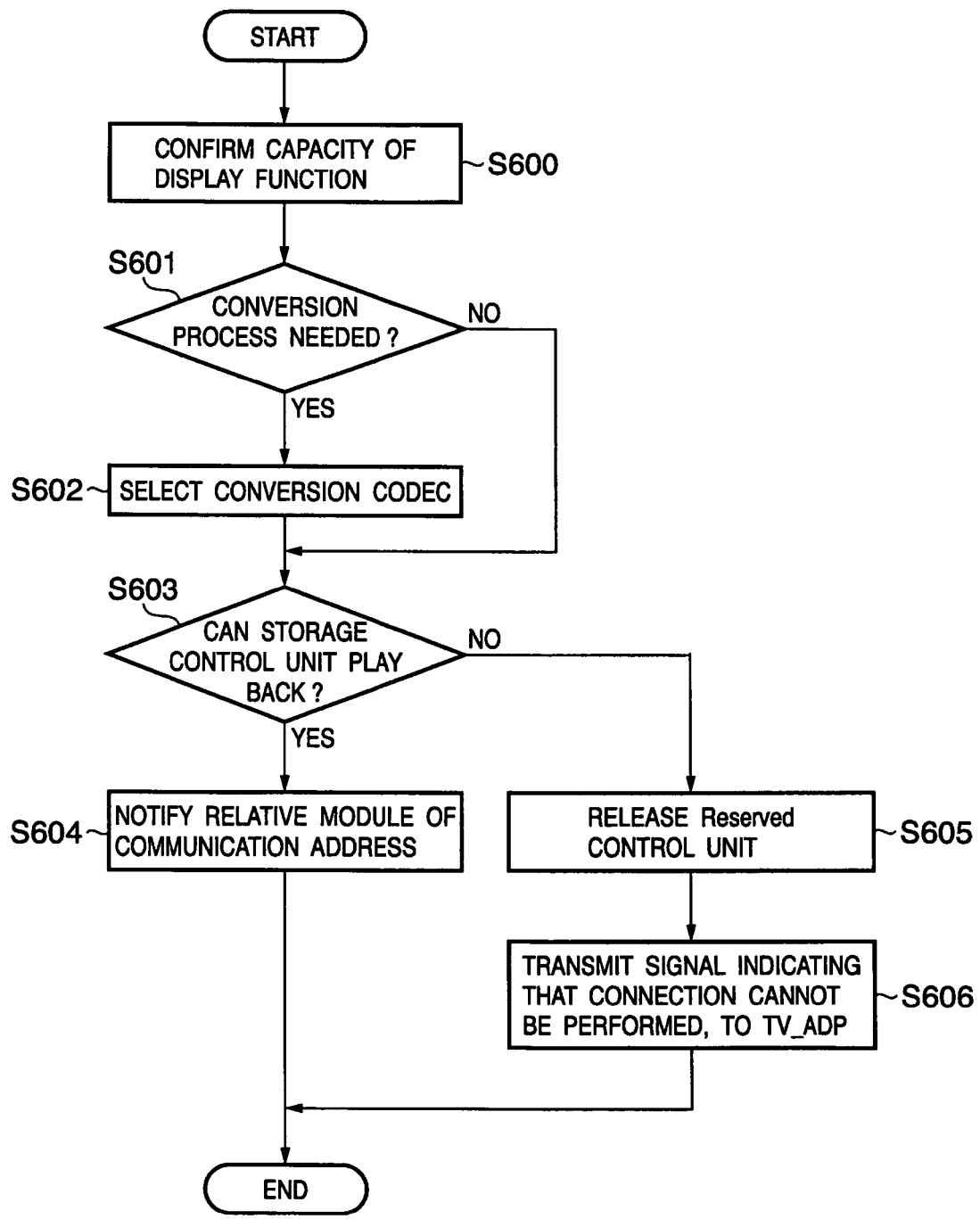
FIG. 6 is a flowchart showing an optimal path selection process in a path control unit of the data I/O apparatus according to the embodiment of the present invention.

FIG. 6 is a flowchart showing an optimal path selection process in the path control unit 100 of the data I/O apparatus according to the embodiment of the present invention.

The connection request signal S313 shown in FIG. 2 contains information such as a content ID and display device ID. Roughly dividing this flowchart into two parts, upon reception of these pieces of information, the path control unit 100 processes the connection configuration in steps S600 and S601, and then determines the apparatus of the control unit to be used in steps S602 to S606.

In step S600, the capacity of the display device is confirmed. At this time, the path control unit 100 holds the capacities of all the control devices in the system. The capacity of the TV_ADP 208b serving as the display device which transmits the connection request signal S313 is shown in Table 1.

TABLE 1

| L100: Specification | L101: Value | | | |
|---|---|---|---|---|
| L102: Image Data | MPEG1 | MPEG2 | — | — |
| L103: Image Size | 1,280 × 720 | 1,152 × 640 | 1,024 × 640 | 800 × 600 |
| L104: Audio Data | Dolby AC-3 48.00 kHz 256 kbps 2ch | | | |

L100 in Table 1 denotes the specification item of a capacity, and L101 denotes the capacity. L102 in Table 1 denotes a displayable image compression data format, and L103 denotes a displayable image size. L104 in Table 1 denotes a playback audio data format. As shown in Table 1, the TV_ADP 208b can decode the image data of MPEG1 and MPEG2. The image data of four sizes in Table 1 can be displayed. The audio data of "Dolby AC-3 48.00 kHz 256 kbps 2ch" can be played back. These capacities of the device can be determined in the initial setting of the system, or automatically registered when connected to the switching unit 103.

In step S601, it is determined whether the conversion process is necessary for displaying the image. If YES in step S601, the flow advances to step S602. If NO in step S601, the flow advances to step S603. In order to perform this determination, a content attribute is confirmed in accordance with the content ID obtained from the connection request of the signal S313. Table 2 is a content management table.

TABLE 2

| L200: Content ID | L201: Contents Name | L202: Image Compression | L203: Bandwidth | L204: fps | L205: Size | L206: Audio |
|---|---|---|---|---|---|---|
| 0001 | Sports Meeting | MPEG2 | 25 Mbps | 29.97 | 1,280 × 720 | Dolby AC-3 48.00 kHz 256 kbps 2ch |
| 0002 | Exhibition | MPEG2 | 3 Mbps | 29.97 | 640 × 480 | Dolby AC-3 48.00 kHz 256 kbps 2ch |
| 0003 | Old Club | MPEG2 | 3 Mbps | 29.97 | 640 × 480 | Dolby AC-3 48.00 kHz 256 kbps 2ch |
| 0004 | Year-end Party | MPEG4 | 2 Mbps | 29.97 | 640 × 480 | Dolby AC-3 48.00 kHz 256 kbps 2ch |
| 0005 | Birthday Party | MPEG2 | 25 Mbps | 29.97 | 1,280 × 720 | Dolby AC-3 48.00 kHz 256 kbps 2ch |

L200 denotes the content ID unique to the content in the system. L201 denotes a content name added by the user, which may be the same as the file name. L202 denotes an image compression scheme used for the content. L203 denotes a transmission bandwidth required for the content. L204 denotes the FPS (Frame Per Second) of the content. L205 denotes the image size of the content. L206 denotes the audio data format of the content.

In this embodiment, for example, the content ID of the connection request is "0004", and the image compression data scheme is MPEG4 as shown in Table 2. Since the playback capacity of the TV_ADP 208b serving as the display device is MPEG2, it is determined that a conversion unit is necessary.

In step S602, a CODEC for conversion is selected. In this case, the management table of this CODEC is shown in Tables 3 to 5.

TABLE 3

| L310: Codec ID | L311: Status |
|---|---|
| 0001 | Busy |
| 0002 | Idle |
| 0003 | Idle |
| 0004 | Busy |

TABLE 4

| L320: IN | L321: OUT | | |
|---|---|---|---|
|  | MPEG1 | MPEG2 | MPEG4 |
| MPEG1 | — | ○ | ○ |
| MPEG2 | ○ | — | ○ |
| MPEG4 | X | X | — |

TABLE 5

| IN | OUT | | |
|---|---|---|---|
|  | MPEG1 | MPEG2 | MPEG4 |
| MPEG1 | — | ○ | ○ |
| MPEG2 | ○ | — | ○ |
| MPEG4 | ○ | ○ | — |

Table 3 is a table indicating the use state of the CODEC. L310 in Table 3 denotes an ID unique to the CODEC in the system. L311 in Table 3 denotes status information, and denotes whether the CODEC is busy or free. In this case, "Busy" is displayed if the CODEC is in use, and "Idle" is displayed if the CODEC is free.

The path control unit 100 has a table indicating the CODEC conversion capacity for each CODEC. The path control unit 100 sequentially confirms the capacities of free CODECs, and selects the CODEC satisfying the connection request signal S313. Table 4 is a capacity table of Codec ID 0002, and Table 5 is the capacity table of Codec ID 0003. In this embodiment, the conversion process from MPEG4 to MPEG2 must be performed. Since the confirmed capacity of Codec ID 0002 cannot convert MPEG4 to MPEG2, the capacity of Codec ID 0003 is confirmed subsequently. Then, the Codec ID 0003 is captured because it can convert MPEG4 to MPEG2. The status information of Codec ID 0003 shown in Table 3 is then set to "Reserved".

In step S603, the state of the disk having the content is checked. If the disk can be played back, the flow proceeds to step S604. If connection cannot be performed because, e.g., the disk transmission bandwidth becomes insufficient, the flow shifts to step S605.

Figure 7:
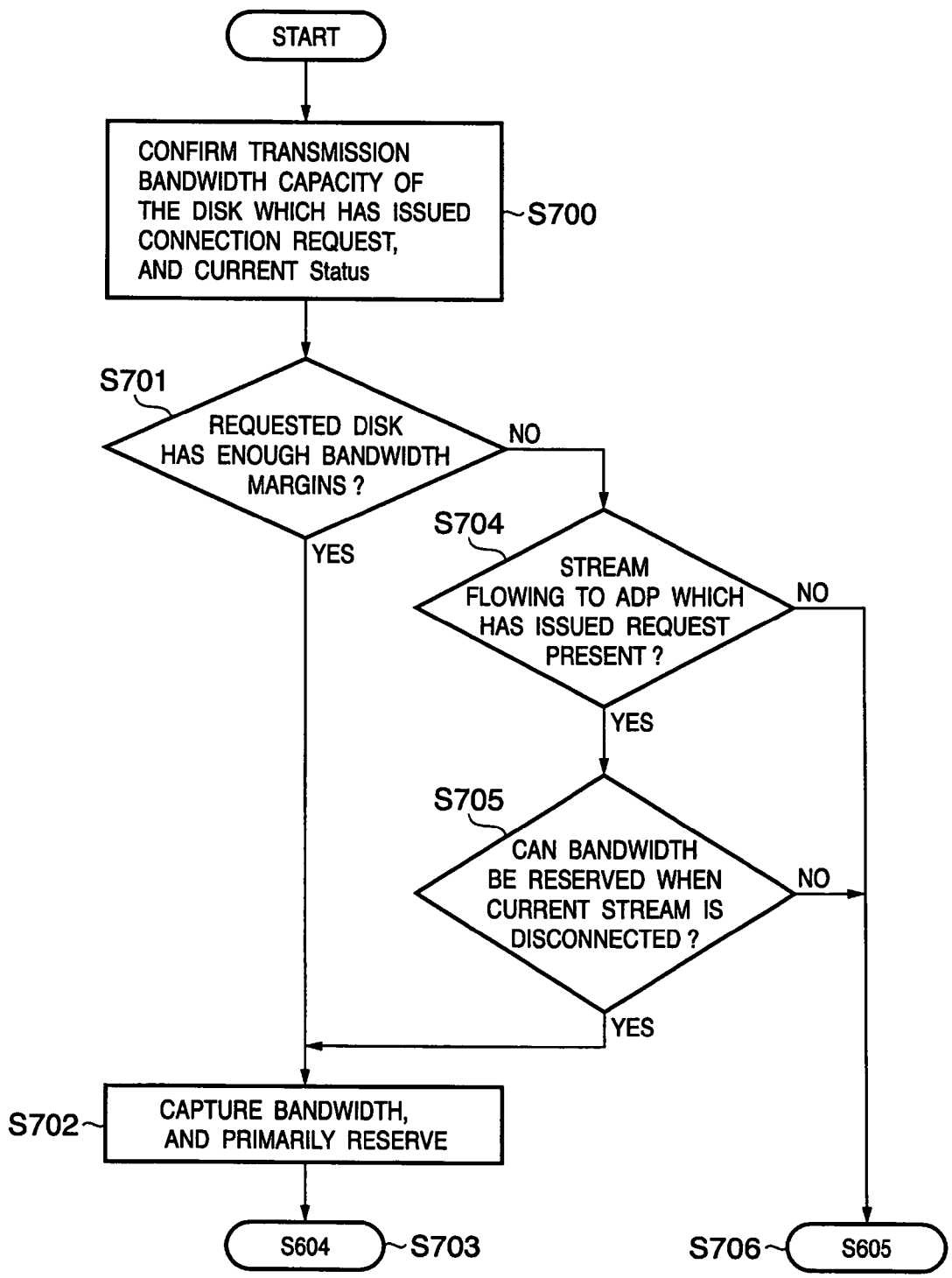
FIG. 7 is a flowchart showing a detailed process in step S603 shown in FIG. 6.

FIG. 7 is a flowchart showing the detailed process in step S603, and this flowchart will be described later.

In step S604, a connection command is transmitted to an associated control unit. In this embodiment, the connection commands are signals S315 to S317 shown in FIG. 3.

In step S605, the "Reserved" status information of each control unit is set to "Idle", and each control unit is released. In step S606, the control unit which has issued the connection request is notified that connection cannot be performed.

The flowchart shown in FIG. 7 will be described below.

In step S700, the transmission bandwidth capacity and current status of the original data HDD 205 which has issued the connection request are confirmed. In this case, the original data HDD 205 can be identified in accordance with the content ID in the connection request. The capacity table of the original data HDD 205 is shown in Table 6'.

TABLE 6

| L400: Specifications | L401: Value |
|---|---|
| Total Capacity | 40 GB |
| Transmission Bandwidth | 60 Mbps |

L400 in Table 6 denotes a capacity specification item, and L401 denotes a capacity. In this embodiment, the total disk capacity of the original data HDD 205 is 40 GB, and the transmission bandwidth is 60 Mbps.

The actual bandwidth being used can be checked from the connection management table of the path control unit 100. This connection management table is shown in Table 7.

TABLE 7

| | L501: From | | L502: To | | | |
|---|---|---|---|---|---|---|
| L500: Path ID | Control Apparatus | Content ID | Control Apparatus | Content ID | L503: Bandwidth | L504: Status |
| 000001 | Input ADP | — | Original HDD | 0005 | 32 | connected |
| 000002 | Original HDD | 0002 | TV ADP | — | 3 | connected |
| 000003 | Original HDD | 0001 | HDTV ADP | — | 25 | connected |

L500 in Table 7 denotes a path ID which is identification information unique to the connection request in the system. L501 is a field indicating the source of the stream, which is managed by the control apparatus and the content ID. L502 is a field indicating the destination of the stream, which is managed by the control apparatus and the content ID.

In this embodiment, the streams D200, D201, and D202 exist as shown in FIG. 2. The sum of the bandwidths of path IDs, i.e., 000001, 000002, and 000003, which access to the original data HDD 205 is 60 Mbps as shown in Table 7.

In step S701, it is determined whether the capacity is equal to or smaller than the transmission band capacity even when the transmission bandwidth of the connection request is added to the sum of the bandwidths of the existing streams. If NO in step S701, the flow proceeds to step S704. If YES in step S701, the flow advances to step S702. In this embodiment, the requested content ID is 0004, and its bandwidth is 2 Mbps as shown in Table 2. When reading out the content ID 0004 while maintaining the state in step S700, the bandwidth becomes 60 Mbps+2 Mbps=62 Mbps. Since the necessary bandwidth capacity is larger than a transmission bandwidth capacity of the original data HDD 205 (60 Mbps), the flow advances to step S704.

In step S702, the status of the connection management table for capturing the connection path is set to "Reserved", and the flow proceeds to step S604. In this case, the state of the connection management table is shown in Table 8.

TABLE 8

| | L501: From | | L502: To | | | |
|---|---|---|---|---|---|---|
| L500: Path ID | Control Apparatus | Content ID | Control Apparatus | Content ID | L503: Bandwidth | L504: Status |
| 000001 | Input ADP | — | Original HDD | 0005 | 32 | connected |
| 000002 | Original HDD | 0002 | TV ADP | — | 3 | connected |
| 000003 | Original HDD | 0001 | HDTV ADP | — | 25 | connected |
| 000004 | Original HDD | 0004 | MPEG CODEC | — | 2 | Reserved |

In step S703, the connection command signal S316 containing address information for permitting and accessing connection is transmitted. In step S704, on the basis of the connection management table of the path control unit 100, the control unit which has issued the connection request confirms whether the stream currently flows to the TV_ADP 208b. If YES in step S704, the flow advances to step S705. If NO in step S704, the flow advances to step S706. In this embodiment, using Table 8, it is determined whether the stream has already flowed to the TV_ADP 208b. In the path ID 000002, since the TV_ADP 208b is connected to the original data HDD 205, the flow advances to step S705.

In step S705, it is determined whether the bandwidth becomes smaller than the transmission bandwidth capacity of the original data HDD 205 when the path detected in step S704 is disconnected. In this embodiment, the path ID 000002 consumes a bandwidth of 3 Mbps. Hence, when this path is disconnected, the total bandwidth becomes 57 Mbps. As a result, a free bandwidth of 3 Mbps can be reserved for the requested connection, and the bandwidth can be ensured. The flow advances to step S702.

In step S702, a command to perform new connection is transmitted to the control unit which has issued the connection request, under the condition that the current path is disconnected, and the process then ends. In this embodiment, the used transmission bandwidth of the Contents ID 0004 to be connected is 2 Mbps. Hence, the Contents ID 0004 can be connected under the condition that the path ID 000002 is disconnected.

The present invention is not limited to the above embodiment, and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-332107 filed on Nov. 16, 2004, which is hereby incorporated by reference herein.

What is claimed is:

1. A data I/O apparatus comprising:
an input control unit configured to input image data via a network;
an output control unit configured to output image data via the network;
an image data conversion unit connected to the network, configured to convert a codec format of image data into a different codec format;
a first storage unit configured to store image data;
a second storage unit configured to store meta-data of the image data stored in said first storage unit;
a first storage control unit connected to the network, configured to control storing image data into said first storage unit;
a second storage control unit connected to the network, configured to control storing the meta-data into said second storage unit;
a switching unit configured to change a connection, based on a destination address, between said input control unit, said output control unit, said image data conversion unit, said first storage unit, and said second storage unit; and
a path control unit configured to maintain a connection management table that represents connections involving the first storage unit and actual bandwidth of the first storage unit being used, and configured to control said switching unit to change the connection between any of said input control unit, said output control unit, said image data conversion unit, said first storage unit, and said second storage unit, a determining unit configured to determine whether the actual bandwidth being used becomes smaller than a transmission bandwidth capacity of the first storage unit, in a case where a connection represented in the connection management table is disconnected;

wherein, upon receipt of a request for a new connection that involves the first storage unit:

the path control unit decides to control the switching unit so as to create the new connection in the case that a sum of the actual bandwidth being used and the transmission bandwidth of the new connection is not larger than the transmission bandwidth capacity of the first storage unit, and the path control unit decides to control the switching unit so as to disconnect a connection represented in the connection management table and create the new connection in the case that said sum is larger than the transmission bandwidth capacity of the first storage unit, but the determining unit determines that the actual bandwidth being used becomes smaller than the transmission bandwidth capacity of the first storage unit after the connection represented in the connection management table is disconnected, and wherein the actual bandwidth being used is obtained from the connection management table.

2. The apparatus according to claim 1, wherein said path control unit adds a unique path ID for each request from a user, and manages the connection using the path ID.

3. The apparatus according to claim 1, wherein the meta-data has moving image data obtained by compressing moving image data stored in said first storage unit.

4. The apparatus according to claim 1, wherein the meta-data contains location information representing a location where original image data is stored.

5. The apparatus according to claim 1, wherein said second storage control unit performs a moving image data search process designated by a search request on the basis of the meta-data stored in said second storage unit, in response to the search request issued via the network.

6. The apparatus according to claim 1, wherein said output control unit issues said request for the new connection to said path control unit, and receives stream image data transmitted via the network in accordance with a connection command from said path control unit, and converts the stream image data for an output device serving as an output destination.

7. The apparatus according to claim 1, wherein said input control unit issues a request to said path control unit, and transmits stream image data via the network in accordance with a connection command from said path control unit, and converts the stream image data for the data I/O apparatus.

8. The apparatus according to claim 1, wherein said path control unit issues a connection control command on the basis of address information indicating an output destination for any of said input control unit, said output control unit, said first storage control unit, and said second storage control unit.

9. The apparatus according to claim 1, wherein said path control unit reserves a resource of a connection path in an initial state.

10. The apparatus according to claim 1, wherein
the path control unit confirms capacity of a display device which transmits the request for the new connection, and selects a codec format of the image data based on a codec table which indicates a capacity of the image data conversion unit, and wherein the image data conversion unit converts the codec format of the image data selected by the path control unit.

* * * * *